Nov. 11, 1952  F. M. BOHLER  2,617,492
COMBINATION SEPARATOR AND TRAP
Original Filed June 7, 1948
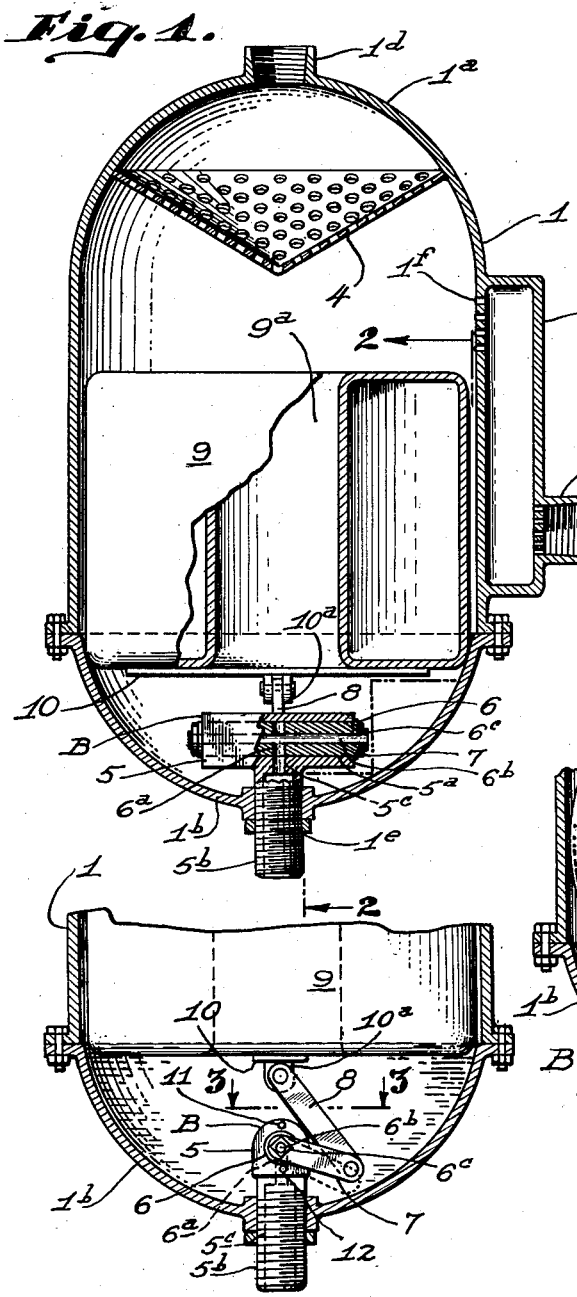
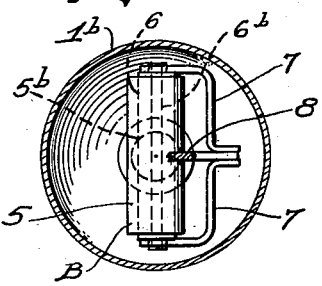
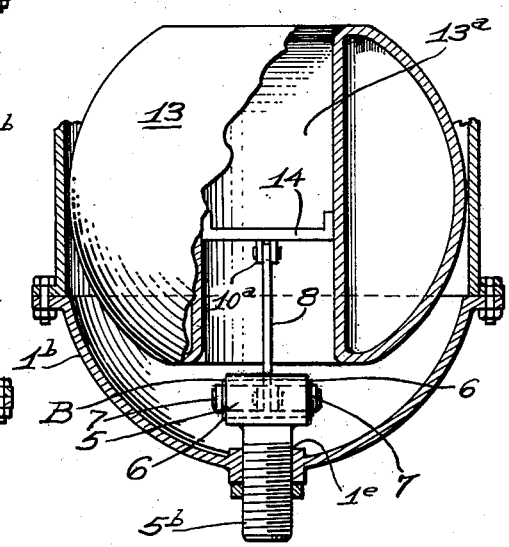
INVENTOR
FRANCIS M. BOHLER
BY William E. Hall
ATTORNEY Patented Nov. 11, 1952

2,617,492

UNITED STATES PATENT OFFICE 2,617,492

COMBINATION SEPARATOR AND TRAP

Francis M. Bohler, Long Beach, Calif.

Substituted for abandoned application Serial No. 31,417, June 7, 1948. This application December 21, 1951, Serial No. 262,878

3 Claims. (Cl. 183—42)

(Granted under the act of March 3, 1883, as amended April 30, 1928; 370 O. G. 757)

The invention described herein may be manufactured and used by or for the Government of the United States of America for governmental purposes without the payment of any royalties thereon or therefor.

This application is a substitute of Francis M. Bohler application Serial Number 31,417, filed June 7, 1948, on Combination Separator and Trap, and now abandoned.

My present invention relates to a steam or similar separator, and to a combination separator and trap.

One of the principal objects of this invention is to provide a device of this class having a novel float for actuating the relief valve, a float which will respond freely to changes of liquid level therein and will not be affected by changes of pressure or fluid flow therein, such as the admission of steam above the float.

Another important object of this invention is to provide a float having a large vertical opening at its central portion, one which may be simply and economically constructed, and one which may be readily and effectively connected to the valve which it controls.

A further important object of this invention is to provide a novel and effective arrangement of a relatively large float, in a device of this class, for positively actuating the relief valve in the device.

With these and other objects in view, as will appear hereinafter, I have devised a separator and trap having certain novel features of construction, combination, and arrangement of parts and portions, as will be hereinafter described in detail, and particularly set forth in the appended claims, reference being had to the accompanying drawings and to the characters of reference thereon, which form a part of this application, in which:

Fig. 1 is a sectional elevational view of a combination separator and trap incorporating my invention in a preferred form;

Fig. 2 is a fragmentary sectional elevational view thereof, taken through 2—2 of Fig. 1;

Fig. 3 is a fragmentary plan view of the relief valve, with the view taken at 3—3 of Fig. 2; and Fig. 4 is a fragmentary view of a combination separator and trap, showing a slightly modified form of construction of the float for controlling the relief valve.

The embodiment of my invention, as shown in the drawings, is in the form of a separator and trap, particularly adapted for separating condensed steam in steam systems and condensation in air systems. As shown in the drawings, it is contained in an enclosure 1 which is cylindrical in a vertical direction and is provided with hemispherical heads 1a and 1b at respectively its upper and lower ends. It has a steam inlet 1c at one side above the bottom end, and a steam outlet 1d in the upper dome end 1a. A third opening 1e, which is the condensed-steam or water outlet, is located in the center of the lower dome end 1b.

The enclosure 1 of my device has a manifold or guard 2 at the side, and preferably arranged at the outer side thereof. The inlet 1c is connected to the lower end of the manifold or guard 2. The upper end of the manifold or guard is connected through a multiplicity of ports 1f with the interior of the enclosure.

Over the discharge opening 1d is a perforated funnel-shaped separating wall 4 which is preferably in the form of an inverted cone. This member 4 facilitates the return of condensation to the interior of the enclosure.

At the bottom of the enclosure is a valve B which controls the flow of condensed steam through the discharge opening 1e. This valve, as shown, consists essentially of a valve block 5 having a horizontal bore 5a in which is rotatably mounted a cylinder valve 6 having a transverse port 6a. The valve cylinder also has a longitudinal or axial passage 6b which is intercepted by the transverse port 6a. The ends of the axial passage communicate freely with the interior of the enclosure and with the liquid or condensation at the lower portion thereof. The valve block 5 has a downwardly extending shank 5b which is externally threaded and screwed into the discharge opening 1e. This shank extends below the enclosure and provides a pipe connection to the lower end of the separator and trap. The valve block has a vertical passage 5c which extends axially through the shank 5b. The passage 5c is intercepted by the bore 5a in which the valve cylinder 6 is mounted, and this passage 5c is adapted to be connected by the transverse port 6a in the valve cylinder to the passage 6b.

The ends of the cylindrical portion of the valve cylinder extend beyond the opposite sides of the valve block, and the extended portions are square or polygonally shaped, as indicated by 6c. The valve cylinder is operatively connected by means of arms 7 and a link 8 to a float 9, one end of the arms 7 being secured to the polygonal portions at the end of the valve cylinder.

The float, as shown in Figs. 1 and 2, is cylindrical in shape in a vertical direction, the height and diameter of the float being substantially equal. This float has a relatively large vertical opening 9ª which is coaxially arranged therein. The outer diameter of the float is only slightly less than the interior of the enclosure and is guided in its vertical movement by the walls thereof. In its lower position, the lower portion of the periphery of the float may rest upon the wall of the hemispherical lower end of the enclosure. Across the bottom portion of the float is a bar 10, this bar extending across the axial portion of the float. The bar has at its lower side downwardly extending lugs 10ª which are pivotally connected by the link 8 to the free ends of the arms 7.

On one side of the valve block are provided stop pins 11 and 12 to limit the extreme positions of the valve cylinder. The stop pins are engageable by at least one of the arms 7, as shown by dotted lines in Fig. 2, the dotted line positions indicating a closed position of the valve, and the solid line position indicating the beginning of the opening of the valve.

As steam or other fluid under pressure is admitted through the opening 1ᶜ, and particularly when the float rests at its lower portion upon the side walls of the enclosure, such fluid under pressure would tend to force or hold the float downwardly, but the provision of the central opening 9ª in the float permits the same freely to rise in response to the liquid level in the enclosure, and thereby permit the valve to be controlled freely by the level of the liquid at the bottom of the enclosure.

The modification of Fig. 4 shows the float 13 in substantially spherical form, the diameter thereof being substantially the diameter of the interior of the enclosure. This float also has a large vertical opening 13ª which is coaxial with the spherical float. The bar 14 in this instance is positioned above the bottom of the float and extends preferably across the opening 13ª, the same being secured to the walls forming the opening. This construction permits the float to extend to a lower position within the enclosure.

I wish it to be understood that I do not desire to be limited to the exact details of construction shown and described, for obvious modifications will occur to a person skilled in the art.

I claim:

1. In a device of the class described, an enclosure having an inlet at its lower portion, an outlet at its upper portion, and a condensation outlet at its lower end, a valve at the lower portion of the enclosure for controlling the condensation outlet, a float within and substantially coextensive laterally with respect to the enclosure, said float having a large vertical through opening at its middle portion, a perforated funnel-shaped separator wall below the outlet, the opening in the float being arranged to receive the apex of the perforated funnel-shaped wall when the float is raised, and means connecting the float to the valve.

2. In a device of the class described, an upright cylindrical enclosure having an inlet at its lower portion, an outlet at its upper portion, and a condensation outlet at its lower end, a valve at the lower portion of the enclosure for controlling the condensation outlet, a circular float within and substantially coextensive laterally with respect to the enclosure, said float having a large vertical through opening coaxially therewith, an inverted conical perforated separating wall carried by the enclosure below the outlet, the opening in the float being arranged to receive the apex of the cone when the float is raised, and means connecting the float to the valve.

3. In a device of the class described, an enclosure having an inlet at its lower portion, an outlet at its upper portion, and a condensation outlet at its lower portion, a cylinder valve at the lower portion of the enclosure for controlling the condensation outlet, the valve having a cylinder rotatable about a horizontal axis, a float within the enclosure, said float having a large vertical through opening at its middle portion, said float having a transverse bar at the bottom portion across the opening, an arm fixed to the axial portion of one end of the cylinder, and a link connecting the free end of the arm to the middle portion of the bar.

FRANCIS M. BOHLER.

REFERENCES CITED

The following references are of record in the file of this patent:

UNITED STATES PATENTS

| Number | Name | Date |
|---|---|---|
| 343,690 | Barry | June 15, 1886 |
| 395,185 | Simpson | Dec. 25, 1888 |
| 596,630 | Iler | Feb. 8, 1898 |
| 1,620,771 | Lorraine | Mar. 15, 1927 |
| 1,871,546 | McClafferty | Aug. 16, 1932 |